United States Patent [19]

Kaye

[11] 4,394,069
[45] Jul. 19, 1983

[54] LIQUID CRYSTAL TUNED BIREFRINGENT FILTER

[75] Inventor: Wilbur I. Kaye, Corona Del Mar, Calif.

[73] Assignee: Beckman Instruments, Inc., Fullerton, Calif.

[21] Appl. No.: 45,725

[22] Filed: Jun. 5, 1979

[51] Int. Cl.$^3$ ................................................ G02F 1/13
[52] U.S. Cl. ................................ 350/347 E; 350/335
[58] Field of Search .............. 350/347 E, 335, 331 R, 350/347 R, 315, 388

[56] References Cited

U.S. PATENT DOCUMENTS

| | | | |
|---|---|---|---|
| 2,600,962 | 6/1952 | Billings | 350/338 X |
| 2,708,389 | 5/1955 | Kavanagh | 350/166 X |
| 3,227,044 | 1/1966 | Hunt et al. | 350/315 X |
| 3,429,636 | 2/1969 | Wentz | 350/388 X |
| 3,753,101 | 8/1973 | Aumont | 350/331 R X |
| 3,881,808 | 5/1975 | Gurtler et al. | 350/335 |
| 4,097,128 | 6/1978 | Matsumoto et al. | 350/347 E |
| 4,232,948 | 11/1980 | Shanks | 350/335 |

OTHER PUBLICATIONS

*Journal of Applied Physics*, vol. 44, No. 11, Nov. 1973, Scheffer, T. J., "New Multicolor Liquid Crystal Displays That Use A Twisted Nematic Electro-Optical Cell".

Tarry: "Electronically Tunable Narrow Band Optical Filter," *Electronics Letters*, vol. 11, pp. 471-472, Sep. 18, 1975.

Sato et al. "Liquid Crystal Color Light Valve," *IEEE Trans. on Electron Devices*, vol. ED-21, pp. 171-172, Feb. 1974.

*Primary Examiner*—John K. Corbin
*Assistant Examiner*—David Lewis
*Attorney, Agent, or Firm*—R. J. Steinmeyer; Robert R. Meads; John R. Shewmaker

[57] ABSTRACT

Moderately narrow band, tunable, birefringent filters are disclosed using zero-twist liquid crystal cells as variable retarders in a Lyot-type birefringent filter. These filters can achieve analytically useful levels of resolution and stray-light ratios for costs that are competitive with prism and grating monochromators. These birefringent filters can be tuned and/or rendered opaque by the application of a suitable voltage to the cells. Thus, a variety of different optical instruments can be constructed with no moving parts. Power requirements are negligible. A useful filter can be designed to occupy a volume less than one cubic inch. These properties render such a filter ideally suited to microprocessor control.

10 Claims, 13 Drawing Figures

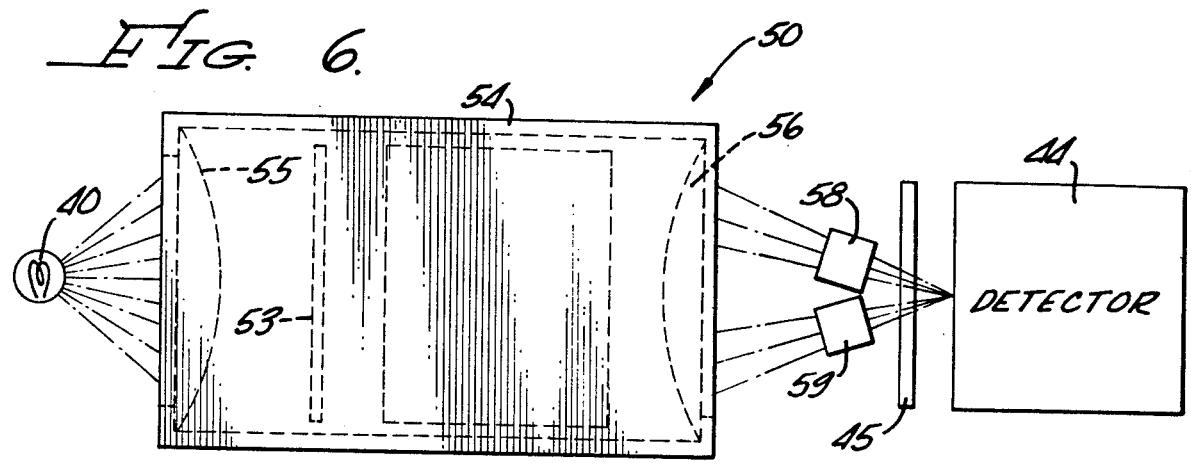
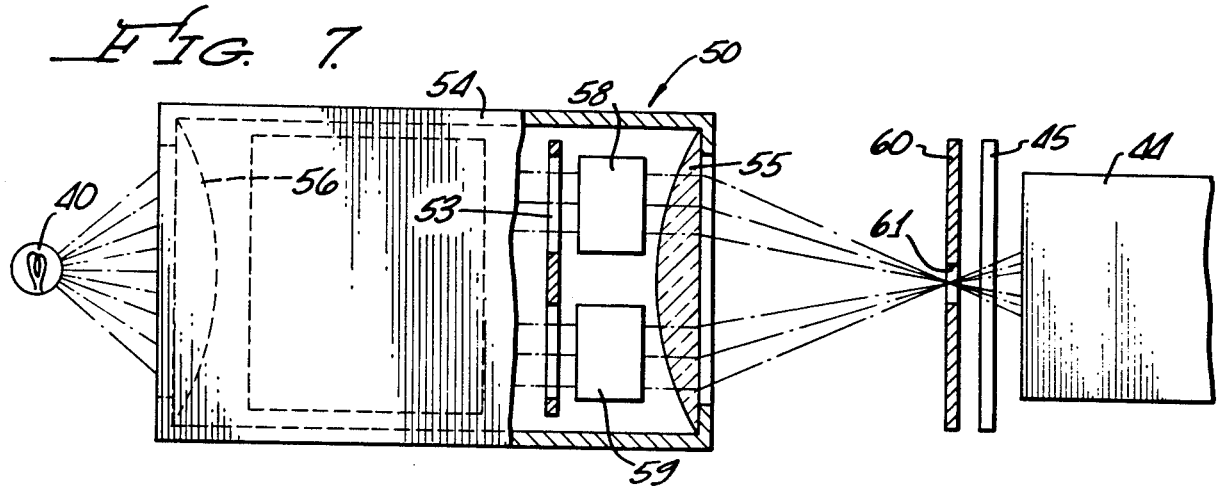
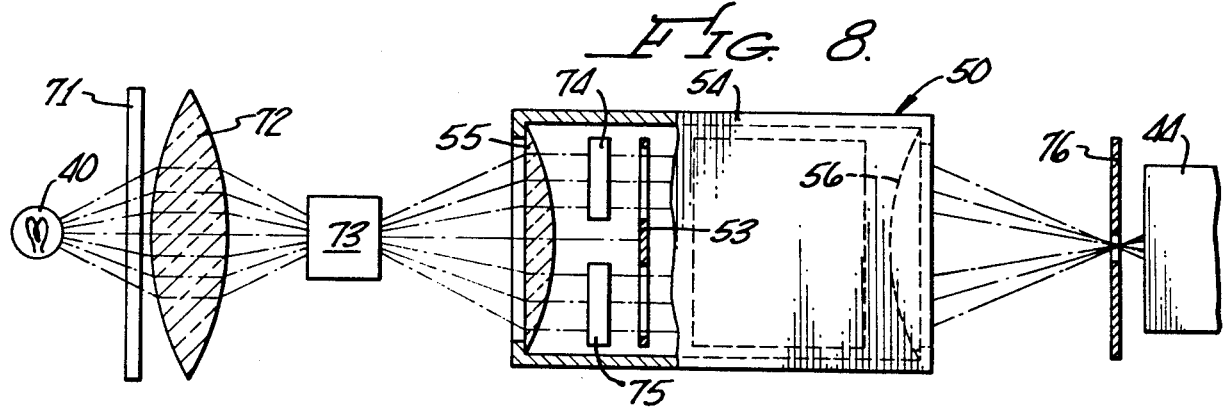

LIQUID CRYSTAL TUNED BIREFRINGENT FILTER

BACKGROUND OF THE INVENTION

1. Field of the Invention

The present invention relates to a liquid crystal tuned birefringent filter and, more particularly, to an electrically tunable filter including stacked birefringent liquid crystal cells.

2. Description of the Prior Art

The principle of the birefringent filter was first suggested by the French astronomer Bernard Lyot in 1933. Lyot constructed filters having a half-bandwidth of about five angstroms and used them for photographing the solar corona in monochromatic light. The Lyot-type filter consists of a stack of elements, each of which consists of a birefringent cell, i.e. a retarder, and a polarizer. For a further discussion of a Lyot-type filter, reference should be made to U.S. Pat. No. 2,718,170, issued Sept. 20, 1955 to Bernard Lyot and entitled Slitless Spectrophotometer.

Birefringent cells have the property that their refractive index, hence the velocity of propagation of light therethrough, varies with direction through the element. Such materials are said to be anisotropic. When a polarized light beam passes through a birefringent cell, the beam breaks into two orthogonally polarized components called the ordinary and extraordinary rays, which propagate with velocities which are inversely proportional to the two refractive indices existing in the directions of beam propagation. These two beams emerge from the birefringent cell with a difference in phase angles. The resultant beam, in general, is said to be elliptically polarized.

When the elliptically-polarized light beam passes through a polarizer, only those components of the beam with their electric vectors in the plane of polarization of the polarizer pass therethrough. The two component beams then interfere and the intensity of the resultant beam is a function of the relative phase angles of the component beams. The greater the product of birefringence and optical path through the birefringent material, the greater the phase angle shift.

If the slow ray emerges with its phase angle 90° behind the fast ray, the two beams totally interfere and the intensity of the beam falls to zero. If the slow ray emerges with its phase angle 180° or some multiple of 180° behind the fast ray, the two rays interefere constructively and there is no diminution of beam intensity.

Assuming that the optic axis of a birefringent cell has been oriented 45° from the parallel planes of polarization of polarizers on opposite sides thereof, the phase angle difference between the component beams is a function of the difference in refractive indices in the orthogonally propagating beam directions, the birefringence, $\Delta n$, the thickness, d, of the birefringent material, and the wavelength, $\lambda$, of light. Thus, the relative phase angle is:

$$\alpha = 2\pi d\Delta n/\lambda \quad (1)$$

The intensity of light passing through the second polarizer, neglecting any absorption losses, is given by the equation:

$$I = 1 - \sin^2(\pi \Delta n d/\lambda). \quad (2)$$

The product $\Delta nd$ is called the retardation. When the retardation equals $M\lambda$, where M is an integer, the intensity equals unity. When the retardation equals $N\lambda/2$, where N is an odd integer, the ordinary and extraordinary rays destructively interfere and the intensity falls to zero. If $\Delta nd$ is kept constant while wavelength changes, intensity will vary in a cyclic manner. The value of M at the design wavelength $\lambda$ is called the order of the element.

According to Lyot, a filter is constructed by using a plurality of birefringent elements, the thicknesses of which increase in a geometrical progression whose ratio is two. The filter elements of Lyot were made of quartz and had their faces parallel to each other and normal to the light rays and their optical axes parallel to one another and forming 45° angles with the planes of polarization of polarizers sandwiched between each cell. By passing a beam of light through such a stack of birefringent elements, each of which produces a different order of retardation, but subject to the restriction that the retardation of each element be integral multiples of a design wavelength, a narrow band pass filter can be constructed, suitable for use in high resolution applications.

The disadvantage of the filter described by Lyot is that it is very expensive and was designed for use at a single frequency, having very limited tunability. On the other hand, many applications require the use of tunable narrow bandwidth filters and attempts have been made to make widely tunable Lyot filters. Lyot, himself, suggested that it was possible to cause the center of the transmitted band to be movable by changing the temperature of the filter and this did indeed provide limited tunability.

If one changes the retardation by changing either or both birefringence, $\Delta n$, or thickness, d, the wavelength at which the fringe maxima occur will change. With most birefringent materials, such as quartz, calcite or mica, it is far easier to change thickness than to change birefringence. The Babinet-Soleil compensator is a commonly used birefringent element consisting of two quartz wedges. In sliding past each other, the effective thickness changes and with it the retardation. It is also possible to change the birefringence in some materials. This has been accomplished by utilizing stressed polymer films as variable retarders. A variable birefringence can also be induced in almost any liquid by applying a strong electric field (usually requiring thousands of volts). The Kerr cell is such a device. A variable birefringence can also be induced in certain ferroelectric crystals by applying a strong field.

All of these filters are either large, overly complex, or very expensive. The result has been that while quite a few versions of the Lyot filter have been developed over the years, they have all been very limited in application to situations where the high expense was acceptable. A relatively low cost Lyot filter, having useful levels of resolution, low stray-light ratios, and wide degrees of tunability has been unavailable heretofore.

SUMMARY OF THE INVENTION

According to the present invention, a moderately narrow band, tunable, birefringent filter is disclosed using zero-twist, nematic-phase, liquid crystal cells as variable retarders in Lyot-type arrangements. These filters can achieve analytically useful levels of resolution and stray-light ratios for costs that are competitive with prism and grating monochromators. Moreover, these birefringent filters can be tuned and/or rendered opaque by applying appropriate voltages to the cells thereof. Thus, a double-beam instrument can be constructed with no moving parts. Power requirements for the filter are negligible and a useful filter can be designed to occupy a volume less than one cubic inch. These properties render such a filter ideally suited to microprocessor control.

Briefly, such a filter comprises a plurality of birefringent liquid crystal cells arranged in a stack, each of the cells including a zero-twist, nematic-phase liquid crystal material with a positive dielectric anisotropy and a polarizer between each cell and before and after the first and last cells, respectively, in the stack. A collimated beam of light is directed through the stack of cells and the emergent beam is utilized and detected. By the careful selection of the orders of the cells, the filter can be made highly transmissive at a single wavelength and can have a relatively high level of resolution and a low stray-light ratio. All of the cells can be electrically connected in parallel and the transmittance wavelength varied over a relatively wide range by the application of a voltage to each of the cells. One of the cells can be used as a modulator to alternately render the cell transmissive and opaque.

It is therefore an object of the present invention to provide a liquid crystal tuned birefingent filter.

It is another object of the present invention to provide an electrically tuned filter including stacked birefringent liquid crystal cells.

It is a still further object of the present invention to provide a moderately narrow band, tunable, birefringent filter using zero-twist, nematic-phase liquid crystal cells as variable retarders in a Lyot-type arrangement.

It is another object of the present invention to provide a liquid crystal tuned birefringent filter having analytically useful levels of resolution and stray-light ratios.

It is still another object of the present invention to provide a liquid crystal tuned birefringent filter having a cost that is competitive with prism and grating monochromators.

Another object of the present invention is the provision of a liquid crystal tuned birefringent filter which can be tuned and or rendered opaque by the application of appropriate voltages to the cells thereof.

Still another object of the present invention is the provision of a double-beam filter instrument having no moving parts.

An additional object of the present invention is the provision of a liquid crystal tuned birefringent filter ideally suited to microprocessor control.

Still other objects, features, and attendant advantages of the present invention will become apparent to those skilled in the art from a reading of the following detailed description of the preferred embodiments constructed in accordance therewith, taken in conjunction with the accompanying drawings, wherein like numerals designate like parts in the several figures and wherein:

BRIEF DESCRIPTION OF THE DRAWINGS

FIGS. 5-11 are schematic cross-sectional views of a variety of double-beam instruments using the filter system of FIG. 4.

DESCRIPTION OF THE PREFERRED EMBODIMENTS

According to Lyot, by stacking a series of birefringent elements, each of which produces a different order of retardation, but subject to the restriction that the retardation of each element be integral multiples of a design wavelength, the stack will have a high transmittance at this wavelength and a low transmittance at nearby wavelengths. According to Lyot, the thicknesses of the elements increase in a geometrical progression whose ratio equals two. Such a filter and the results thereof are described in U.S. Pat. No. 2,718,170.

It is the teaching of the present invention to utilize nematic-phase, zero-twist liquid crystal cells as the retarders of a Lyot-type filter. When so used, the filter becomes tunable over a relatively wide range by the simple expedient of changing the voltages applied to the cells. However, before describing the application of the liquid crystal cell to a Lyot-type filter, it becomes necessary to understand the applicable parameters of the cell itself and the considerations involved in making a cell suitable for use in a Lyot-type filter.

Figure 1:
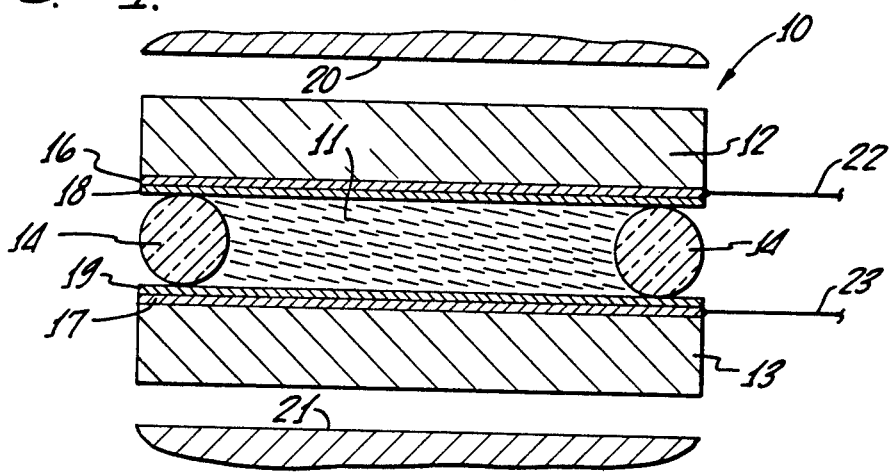
FIG. 1 is a schematic cross-sectional view of a liquid crystal cell constructed in accordance with the teachings of the present invention.

Referring now to the drawings and, more particularly, to FIG. 1 thereof, there is shown a liquid crystal cell, generally designated 10, constructed in accordance with the teachings of the present invention. Cell 10 consists of a thin layer of liquid crystal material 11 sandwiched between first and second transparent plates 12 and 13 which are preferably made from glass. The spacing between plates 12 and 13 and, therefore, the thickness of the liquid crystal layer is determined by suitable spacers, preferably plural glass fibers 14. The inside surfaces of plates 12 and 13 are coated with transparent conducting layers 16 and 17, respectively, and transparent alignment layers 18 and 19, respectively. Conducting layers 16 and 17 are connected to electrical leads 22 and 23, respectively.

For use with a Lyot-type filter, the liquid crystal material 11 is of the nematic-phase type with a positive dielectric anisotropy. The most important properties of the liquid crystal material 11 are absorption, birefringence, viscosity, dielectric, anisotropy, and temperature range of the nematic phase. A variety of suitable materials are known to those skilled in the art. A mixture of trans cyano, alkyl biphenyl homologues is one of the most widely used materials for liquid crystal displays. Another available material is a pure trans cyano, propyl phenyl cyclohexane. Another available material is a eutectic mixture of propyl, pentyl, and heptyl cyano phenyl cyclohexane in the mole ratio 2.1 to 1.6 to 1.

Ideally, one would like a liquid crystal material to exhibit negligible absorption, high birefringence, low viscosity, high dielectric anisotropy, and a wide temperature range of the nematic phase. However, there are theoretical reasons why improving one parameter necessarily impairs another.

Considering the property of absorption, it should be obvious that a liquid crystal mixture can be used in a birefringent filter only within a wavelength interval where it is acceptably transparent. Not so obvious is the limitation on the dichroism of the liquid crystal material 11. Dichroism is defined as the difference in absorbance for the ordinary and extraordinary beams and operates as a limit on the short wavelength behavior of a birefringent element. Dichroism results in an unequal intensity of ordinary and extraordinary rays emerging from a liquid crystal cell and incident on a polarizer. Therefore, these rays can never totally interfere. Consequently, the amplitudes of oscillations in the retardation spectra are reduced. Dichroism is inherent in liquid crystal molecules. The molecular structure responsible for the refraction anisotropy and dielectric anisotropy should be expected to produce dichroism. Furthermore, the higher the birefringence, the higher the dichroism to be expected.

Just how much dichroism can be tolerated in any given application is a factor which needs to be considered. The dichroism will always lower the retardation contrast most in the thickest birefringent cell. Since dichroism increases with increasing birefringence, obviously a compromise must be made in selecting a given liquid crystal material.

Considering the property of birefringence, this property is defined as the difference between the refractive indices measured with rays whose E vectors are parallel and perpendicular to the optic axis of the liquid crystal cell. It is appropriate to differentiate between two types of birefringence, the principal birefringence, $\Delta n$, which has the above definition, and the apparent birefringence, $\Delta n'$, which is a function of $\Delta n$, applied voltage, and the tilt of the liquid crystal director relative to the cell plates, caused either by the electric field or the wall forces, as will be described more fully hereinafter. In any event, the apparent birefringence can be calculated from a spectrum obtained when placing cell 10 between parallel polarizers with the molecular director, defined by layers 18 and 19, in a plane 45° to the beam plane of polarization. Spectra so obtained are herein called retardation spectra.

The equation for the normalized (corrected for absorption and reflection losses) transmittance, $T_R$, as a function of wavelength, $\lambda$, is:

$$T_R = 1 - \sin^2(\lambda \Delta n' d/\lambda). \quad (3)$$

Maxima will occur when $\Delta n' d/\lambda$ equals M, and minima will occur when $\Delta n' d/\lambda$ equals $(2N-1)/2$, where M and N are integers.

The order of the retardation is defined and described by M. This order is easily identified by applying voltage to the cell. Sixteen volts usually suffices to reduce $\Delta n'$ to nearly zero and the retardation, $\Delta n' d$, then approaches zero. Upon slowly reducing the voltage, the number of transmittance oscillations identifies M.

Considering the property of viscosity, suffice it to say hereat that viscosity influences the response time of the cell as the voltage applied thereto is changed.

Concerning the property of dielectric anisotropy, suffice it to say that the higher this parameter, the lower the voltage required to rotate the liquid crystal molecules. However, since there is little need for a birefringent filter to respond to very low voltages, just about all of the materials mentioned hereinbefore have an acceptable dielectric anisotropy.

Considering the property of nematic temperature range, the birefringence of a liquid crystal is a function of temperature and all applications will require thermostatic control, typically within plus or minus 0.5° C.

For use in a Lyot filter, plates 12 and 13 should have high transmittance, low strain, and maximum flatness. The sides of plates 12 and 13 are typically polished to ¼ fringe.

Conducting layers 16 and 17 are typically a tin-doped $In_2O_3$ layer. The technique for the deposition of such a layer onto plates 12 and 13 is well known to those skilled in the art.

In a liquid crystal cell, it is necessary to align the liquid crystal molecules such that the long axes of the molecules are parallel to each other and approximately parallel to the surfaces of plates 12 and 13. This can be achieved by rubbing the inside surfaces of plates 12 and 13, as is known in the art. Alternately, alignment layers 18 and 19 on the inside surfaces of plates 12 and 13 may be used. In this later case, the liquid crystal molecules are typically aligned with layers of SiO deposited by evaporation at low or high angles relative to the surfaces of plates 12 and 13 (so called L and H coats). The alignment properties of SiO layers 18 and 19 will be described more fully hereinafter.

As mentioned previously, the thickness and parallelity of plates 12 and 13 is of utmost importance. Accordingly, conventional methods of separating plates 12 and 13 are unsuitable for use in a birefringent filter. According to the preferred embodiment of the present invention, glass fibers, such as plural fibers 14, have proven to be suitable for use as separators. Fibers can be produced having a diameter from 3 to 50 $\mu$m and cut into segments. These segments can be examined under a microscope to select segments having a uniform thickness and the desired diameter. After plates 12 and 13 are formed and positioned on opposite sides of these selected fibers 14, the entire structure can be clamped together and sealed with plastic in a manner similar to that used in the manufacture of liquid crystal displays.

For use in a Lyot filter, each cell 10 is sandwiched between a pair of polarizers 20 and 21. According to the present invention, the optical axes of polarizers 20 and 21 are parallel and oriented at a 45° angle to the optical axis of cell 10. The significance of this will be described more fully hereinafter with regard to the discussion of a plurality of cells for use in a filter.

Still considering cell 10, it is essential that the retardation in each cell of a plurality of stacked cells be uniform across the area common to a beam of light passing therethrough. Furthermore, since the retardation will be a function of the voltage applied to layers 16 and 17, retardation must vary equally over the area of the beam when the field is applied. This uniformity can only be obtained when liquid crystal layer 11 is in a uniform nematic phase.

In the absence of a field applied between layers 16 and 17, the liquid crystal molecules assume an orientation dictated by alignment layers 18 and 19. That is, the angle between the director, or optic axis, and the plane of electrodes 16 and 17 in the absence of a field is called the surface director tilt and is a function of alignment layers 18 and 19. The two alignment layers most commonly encountered in liquid crystal displays are the so-called H and L coats formed by depositing SiO on plates 12 and 13 at incidence angles of about 60° and 83°, respectively. It has been ascertained that the surface director tilt with an H coat is 0° and with an L coat is 25°. Other alignment layers known to those skilled in the art produce intermediate surface director tilts.

Four general classes of liquid crystal structure can be identified depending upon the surface director tilts. These classes will be called HH (both layers 18 and 19 being H layers), HL (one of layers 18 and 19 being an H layer and the other being an L layer), uniform LL (both layers 18 and 19 being L layers with the directors tilted in the same direction), and splayed LL (both layers 18 and 19 being L layers with the directors titled in opposite directions).

When a field is applied to any of these cells, by applying a voltage between conducting layers 16 and 17, via leads 22 and 23, respectively, the field exerts a torque on the liquid crystal molecules and this torque is a function of the field strength, the dielectric anisotropy of the liquid crystal molecules, and the tilt of the liquid crystal molecules. Since the wall forces are stronger than the field forces, those molecules adjacent to plates 12 and 13 are relatively uninfluenced by the field. The elastic forces of the liquid crystal structure then distribute tilt within the cell and those molecules at the center of the cell are usually tilted most.

In the class HL and uniform LL cells, all the liquid crystal molecules have a finite tilt at zero field. Consequently, any applied field exerts an immediate torque on the molecules and they rotate in the direction initiated by the surface director tilt. In the class HH cells, there is no tilt at zero field; hence, there is no preferred direction for the molecules to rotate when a field is applied. Consequently, different areas of the cell tilt in opposite directions, making this class of cells unsuitable for use in a filter.

The splayed LL cells exhibit an even more troublesome behavior. When a field is applied to these cells, the tilted molecules away from the walls experience the highest initial torque and rotate in directions to increase tilt; however, molecules of opposite tilt exist in these cells at zero field. In an effort to accommodate the elastic forces within these cells, the liquid crystal molecules assume a 180° twist which persists when the field is removed. For this reason, the splayed configuration is to be avoided in a birefringent filter.

Turning to the uniform LL structure, it is noted that splaying cannot occur, hence, it is not usually possible to obtain a twisted structure. The finite surface director tilt also eliminates reverse tilt behavior. Obviously, therefore, this type of cell is to be preferred. Its main disadvantage is the reduced apparent birefringence because of the surface director tilt, but this disadvantage may be negligible if an alignment layer producing a tilt of 3°-10° is used.

Figure 2A:
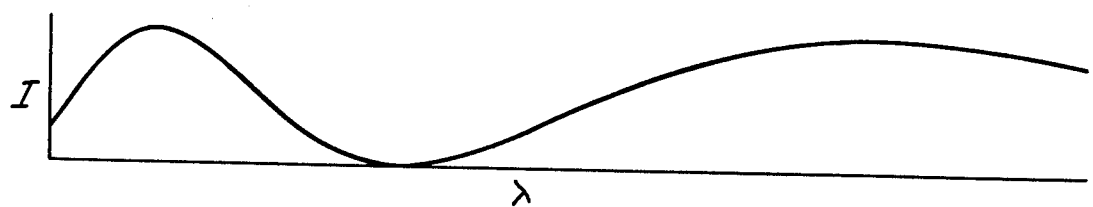
FIGS. 2(a)-2(d) are a series of waveforms useful in explaining the operation of a Lyot-type filter.
Figure 2B:
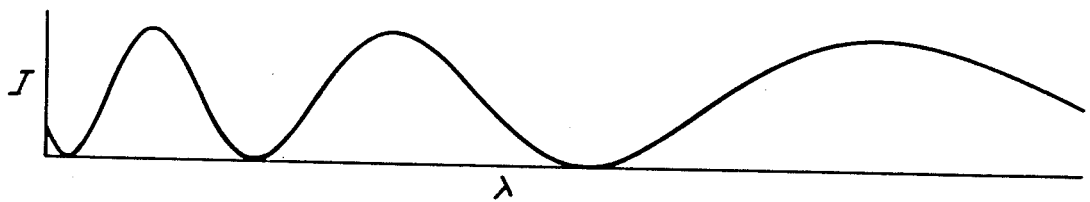
Figure 2C:
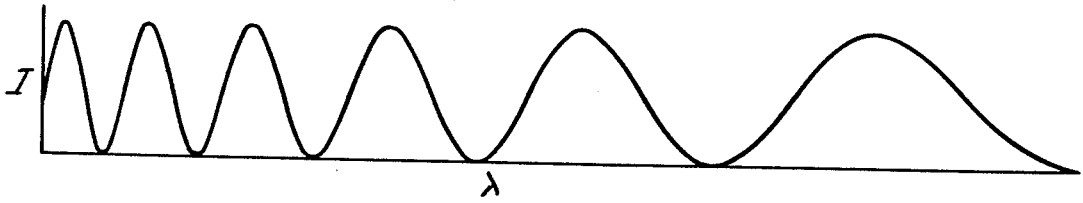
Figure 2D:

Ignoring for the moment the complicating factors of source irradiance, detector sensitivity, system absorption, and retarder dispersion, which will be discussed more fully hereinafter, FIG. 2(a) is a plot of the intensity of light passing through a cell, such as cell 10, with polarizers on opposite sides thereof, as a function of wavelength, with $\Delta n d$ held constant. It is seen that as the wavelength changes, intensity will vary in a cyclic manner. FIG. 2(b) shows the intensity of light passing through a cell of twice the thickness of the first cell as a function of wavelength. FIG. 2(c) shows the intensity of light passing through a cell whose retardation is four times that of the cell exhibiting the transmittance shown in FIG. 2(a). If a light beam now passes sequentially through all three cells, separated by polarizers, the transmittance spectrum is shown in FIG. 2(d). It is seen that the addition of multiple retarders has the effect of decreasing the half bandwidth of the primary maxima while reducing the intenstiy of the intermediate sidebands. The most efficient reduction in sideband intensity occurs for geometric progressions of retarder thickness. A blocking filter is commonly used in Lyot filters to eliminate one of the two remaining peaks.

Two of the important properties of a filter are half bandwidth (HBW) and stray-light ratio (SLR). The width of the two high-intensity bands at half maximum intensity is called the half bandwidth. The SLR is the ratio of detected radiant power outside of a given bandwidth to the total detected radiant power. The usual given bandwidth is defined as that spectral region five half bandwidths on either side of the design wavelength. Resolution improves inversely in proportion to HBW. Accuracy in the ultimate use of a filter increases inversely in proportion to SLR. Thus, we desire to achieve both a small HBW and a small SLR.

Increasing the number of elements in a filter reduces the HBW but does not necessarily reduce the SLR. The reason is that when the number of elements is increased, the denominator of the SLR may decrease faster than the numerator. Increasing the number of elements in a filter, where all elements have the same order, M, decreases HBW slowly while rapidly decreasing SLR. Adding elements to a filter in a geometric progression of M, as described by Lyot, rapidly decreases HBW but actually increases SLR. The challenge in designing a good filter is in selecting orders of elements between these extremes. According to the present invention, the best compromise is found in an arithmetic progression of low order elements and a near geometric progression of high order elements, as will be discussed more fully hereinafter.

In order for a filter to be useful for clinical applications, a filter at 700 nm would have to have an HBW of less than 20 nm and a SLR of well under 1%. As will be discussed more fully hereinafter, this can be achieved with a filter consisting of seven or more elements.

Figure 3:
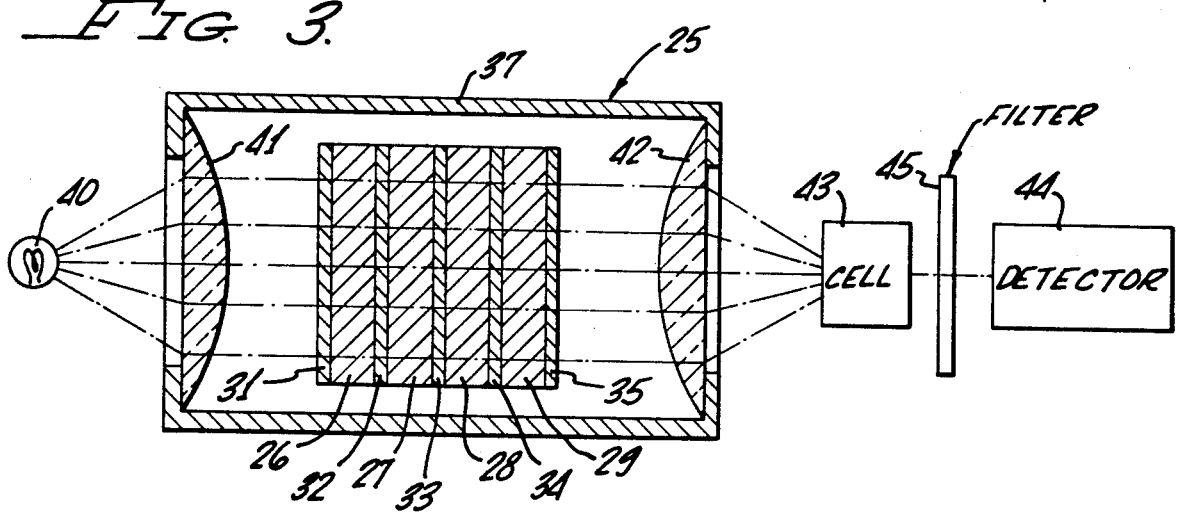
FIG. 3 is a schematic cross-sectional view of a single-wavelength instrument utilizing a filter constructed in accordance with the teachings of the present invention.

A generalized form of a filter, generally designated 25, constructed in accordance with the teachings of the present invention, is shown in FIG. 3. With reference to FIG. 3, filter 25 includes four cells 26-29, each identical to cell 10 of FIG. 1. In actuality, more cells may and will be included. A polar 31 is positioned on the outside of cell 26, a polar 32 is positioned between cells 26 and 27, a polar 33 is positioned between cells 27 and 28, a polar 34 is positioned between cells 28 and 29, and a polar 35 is positioned on the outside of cell 29. A cell and a polarizer make up an element. It is seen that there is one more polarizer than there are elements.

Cells 26-29 and polars 31-35 are mounted within a thermostated enclosure 37. In the simplified embodiment shown in FIG. 3, a pair of contacts are required for each cell and these would extend out through enclosure 37. One contact of each cell may be interconnected to form a common ground. A temperature in the range of 37°-45° C. is contemplated with a tolerance of plus or minus 0.5° C. A filter, including thermostat, can be as small as 1×1×½ inches.

In its most simple use, light from a source 40 may be collimated by a lens 41 and conducted through the arrangement of cells and polars in enclosures 37. A second lens 42 refocuses the filtered beam on a cell 43 holding a sample under test. A detector 44 may be positioned close to cell 43 to detect rays scattered by the sample. A blocking filter 45 may be positioned between cell 43 and detector 44 to restrict the tuning range of filter 25. Blocking filter 45 also serves to reduce the sensitivity of detector 44 to ambient light when cell 43 is not totally enclosed.

The waveforms of FIGS. 2(a)-2(d) show the transmittance spectrum of a multiple element filter, such as filter 25, ignoring the complicating factors of source irradiance, detector sensitivity, system absorption, and retarder dispersion. However, in reality, these factors must be considered. In fact, the dispersion of real birefringent materials considerably modifies the simple theory.

Specifically, all known birefringent materials exhibit a significant wavelength dependence of birefringence across the visible region. This dispersion of birefringence forces the interference minimum of one order to fall at some other wavelength than that for the interference maximum at geometrically lower or higher orders. This complicates the design of an optimum filter and requires the use of orders in other than geometric progression.

Determination of the optimum order combination is determined by experimentation. Equation (2) permits the generation of a retardation spectrum for a retarder of a given order. The following equation closely defines the dependence of birefringence on wavelength for a typical liquid crystal mixture and can be used in place of $\Delta n$:

$$\Delta n = (1.215)10^{-1} + (4.253)10^{-2}/\lambda^2 - (8.198)10^{-3}/\lambda^{-4} + (7.069)10^{-4}/\lambda^6. \qquad (4)$$

Generating such a retardation spectrum, typically using a computer, for a filter with a design wavelength of 700 nm, will show that all curves reach maximum transmittance at 700 nm and also at 432 nm, rather than at 350 nm. At 432 nm, the ratio of the retardation to the wavelength is twice that at 700 nm for all orders. The interval between these two wavelengths will be called one octave of retardation. If stray light is to be held within tolerable limits, some mechanism must limit system response to less than one octave of retardation. This may be source irradiance, detector sensitivity, or the use of a blocking filter.

A computer simulation is the preferred method of selecting the number of elements and the order of such elements to achieve a given result. This computer simulation must consider the spectral emittance of the source and the spectral sensitivity of the detector as well as fundamental equations (3) and (4). Actually, the best criteria for selection of order combinations is the integration of signal transmitted in the interval of stray light divided by the total integrated signal. A convenient way of appraising this data is to plot the accumulated sum as a function of wavelength away from the design wavelength. In this way, one can determine the span of tunability for some specified SLR. Such a computer simulation has shown that an eight element filter with the orders 1,1,2,3,4,5,8 and 13 will give a resolution of 20 nm and a stray-light ratio of 1% at 700 nm while tuning over the range of 480-700 nm with a single blocking filter. This same filter, with different blocking filters, will exhibit the same characteristics with a resolution of 12 nm and 8 nm in the ranges of 385-480 nm and 340-385 nm, respectively. It can be seen that such a filter has an arithmetic progression of low order elements and a near geometric progression of high order elements.

In forming such a filter, each cell would be identical except that progressive cells will have different thicknesses in accordance with the orders. Thus, a 13th order cell will be thirteen times as thick as the first order cell. However, the thicker a cell, the slower its response time and, as a result, the higher orders of cells often become excessively thick and slow. This undesirable situation can be overcome in a variety of different ways; such as, using, instead of one thick cell, two or more stacked cells having lesser thicknesses. In such a case, more than one cell would be positioned between consecutive polarizers. Alternatively, a liquid crystal cell of reduced thickness can be combined with a fixed retarder made of quartz or a polymer film.

It will be mentioned here, briefly, that it is possible to flatten the detected radiant power spectrum and simultaneously limit a filter's practical range by using blocking filters. These filters can be of two types, glass absorption and interference. The use of such blocking filters in filter instruments is well known to those skilled in the art.

With a filter, such as described hereinbefore and as to be described more fully hereinafter, it is possible to make a variety of different types of double-beam and dual-wavelength photometers with no moving parts. It is evident that two types of birefringent filters are possible: the continuously tunable type and the step tunable type. The retardation of all elements must be smoothly adjustable in the continuously tunable filter. In the step-tuned filter, this is not required.

Figure 4:
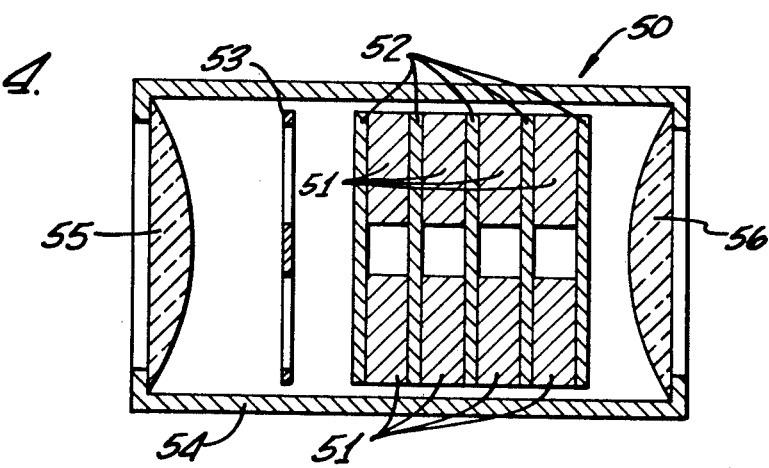
FIG. 4 is a schematic cross-sectional view of a double-wavelength filter constructed in accordance with the teachings of the present invention.

FIG. 4 shows a birefringent filter, generally designated 50, for use in a dual wavelength photometer. Filter 50 includes four stacked sets of cells 51 sandwiched between polars 52. The general configuration of filter 50 is the same as filter 25, except that each cell of filter 25 is replaced by a pair of parallel cells 51. This provides dual wavelength operation. An aperture plate 53 masks all but the two desired areas of the liquid crystal cells 51 defined by the cell conducting layers. These components are mounted within a thermostated enclosure 54 having lenses 55 and 56 at opposite ends thereof, as described previously with regard to filter 25. Ideally, the two lenses are achromatic over the range 340-700 nm. In practice, the finite size of real sources and the dispersion of real lenses will distort the beam collimation, but perfect collimation is not required. No electrical contacts are shown in FIG. 4, as is the case with all other figures. Three contacts are required for each pair of parallel cells 51, a common ground and one lead for each half.

Figure 5:
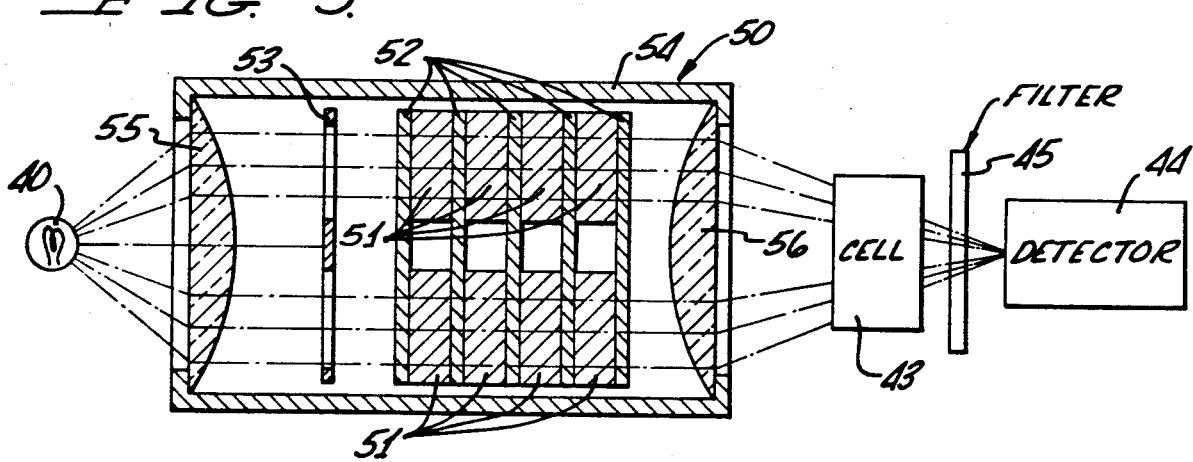

FIGS. 5 through 11 show how filter 50 may be used for absorption, fluorescence and reflectance spectroscopy. No moving parts are required except for the wavelength range selector which may be ganged to the blocking filters shown. More specifically, FIG. 5 shows filter 50 used for dual-wavelength spectroscopy, the arrangement being similar to that shown in FIG. 3 for a single-wavelength instrument. That is, reference numeral 40 designates a continuum source, which may be a low-voltage, filament, tungsten lamp. The beam emerging from filter 50 is focused through cell 43 holding a sample under test onto detector 44 which is positioned close to sample cell 43 in order to detect light scattered by the sample. Blocking filter 45 is positioned between sample cell 43 and detector 44 to restrict the tuning range of filter 50.

For dual-wavelength measurements, three signals are desired. The first signal is proportional to the intensity $I_1$ when filter 50 (either or both halves) is set to wavelength $\lambda_1$ with a beam passing through the sample. The next signal is proportional to the intensity $I_2$ when the signal is set to wavelength $\lambda_2$ and the third signal is proportional to the intensity $I_3$ when the filter is opaque. The manner in which this can be achieved will be described more fully hereinafter. The desired quantity is usually:

$$I_1 - I_3/I_2 - I_3. \qquad (5)$$

These three signals are sequentially obtained as the voltage is changed on the cells in filter 50.

In FIG. 6, filter 50 is used for double-beam absorption spectroscopy. In this case, sample and reference cells 58 and 59 are positioned in the paths of the two beams, as shown. Otherwise, the configuration remains unchanged. If it is desired to maintain the sample at the same temperature as filter 50, cells 58 and 59 could be located within enclosure 54, immediately in front of lens 55, as shown in FIG. 7. Blocking filter 45, detector 44, and source 40 serve the same functions as described in FIG. 5.

For double-beam spectroscopy, both halves of filter 50 transmit the same wavelength, but at different times. This is accomplished by alternately setting the two halves of the filter to be opaque. Three temporally separated signals are obtained from detector 44, the third occurring when both halves are opaque. Identifying these signals as $I_{58}$, $I_{59}$, and $I_3$, the transmittance of a solution placed in cell 58 with a solvent in cell 59 is given by:

$$T = I_{58} - I_3/I_{59} - I_3. \qquad (6)$$

The instrument configuration shown in FIG. 6 is well suited for the measurement of diffused transmittance of turbid samples because detector 44 may be located close to cells 58 and 59.

In some cases, it is desirable to reject the rays scattered by a sample. The configuration shown in FIG. 7 accomplishes this objective. The instrument configuration shown in FIG. 7 is similar to that shown in FIG. 6, with the primary distinction being that detector 44 and blocking filter 45 are spaced from lens 55 so that an aperture plate 60, having a small pin hole 61, may be positioned at the focal point of lens 55. Also, cells 58 and 59 are shown located within enclosure 54, between aperture plate 53 and lens 55.

Fluorescence measurements with a 0° illumination geometry can be made with the configuration shown in FIG. 8. The configuration of FIG. 8 includes source 40, which may be the same type used in FIGS. 5–7, or may be an emission source such as a mercury arc. On one side of source 40 is a blocking filter 71 of the short-path variety designed to pass the exciting radiation and reject the fluorescent radiation. Adjacent filter 71 is a lens 72 which focuses this exciting radiation on a sample in a sample cell 73. The radiation from cell 73 impinges on lens 55 of filter 50, which has a pair of blocking filters 74 and 75 positioned within housing 54, between lens 55 and aperture plate 53.

Blocking filter 74 is designed to pass the fluorescing radiation and reject the exciting radiation. The upper half of filter 50 can then be tuned to the desired portion of the fluorescence spectrum. Blocking filter 75 is designed to pass the exciting radiation while rejecting the fluorescent radiation. The lower half of filter 50 is tuned to the wavelengths of exciting radiation. The focused beam from filter 50 passes through an aperture plate 76 onto detector 44. The signals from detector 44 are again sorted by alternately tuning the halves of filter 50 to be opaque. The desired output is the ratio of the zero corrected fluorescence to zero corrected excitation signals.

The configuration shown in FIG. 8 can be used in a single-beam mode by tuning both halves of filter 50 to the same fluorescence wavelength (alternated with opaque zero measurements). Blocking filter 75 would then be identical to filter 74. This mode does not compensate for source fluctuations, but permits use of exciting light of wavelength shorter than 340 nm (filter 50 being opaque to these wavelengths). Furthermore, by switching source 40 and detector 44 positions in FIG. 8, the configuration can be used for excitation spectroscopy provided the excited light need not have a wavelength shorter than 340 nm.

Figure 9:
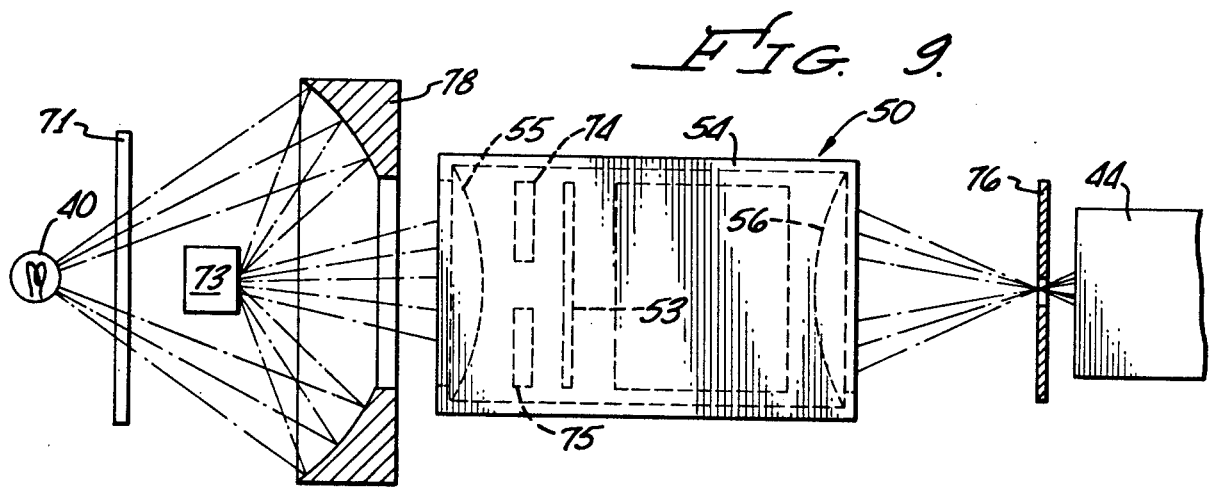

The 0° illumination geometry of FIG. 8 is suitable only for samples which exhibit low absorption of both exciting and fluorescing radiation. When absorption is high, a front illumination is better and is superior to the 90° geometry conventionally used. FIG. 9 shows how this illumination geometry can be adapted for a birefringent filter.

Referring now to FIG. 9, the configuration is similar to that shown in FIG. 8, except that lens 72 is replaced by a mirror 78, which is an annular segment of an elipsoid, which focuses the rays from source 40 onto the sample in cell 73. Blocking filter 71 again passes the exciting radiation while rejecting the fluorescing radiation. In this case, if the front surface of sample cell 73 is lightly etched, a sufficient amount of the exciting radiation will scatter back through blocking filter 75 to give a signal proportional to the exciting intensity. The fluorescence radiation passes through blocking filter 74 and the upper half of filter 50.

Figure 10:
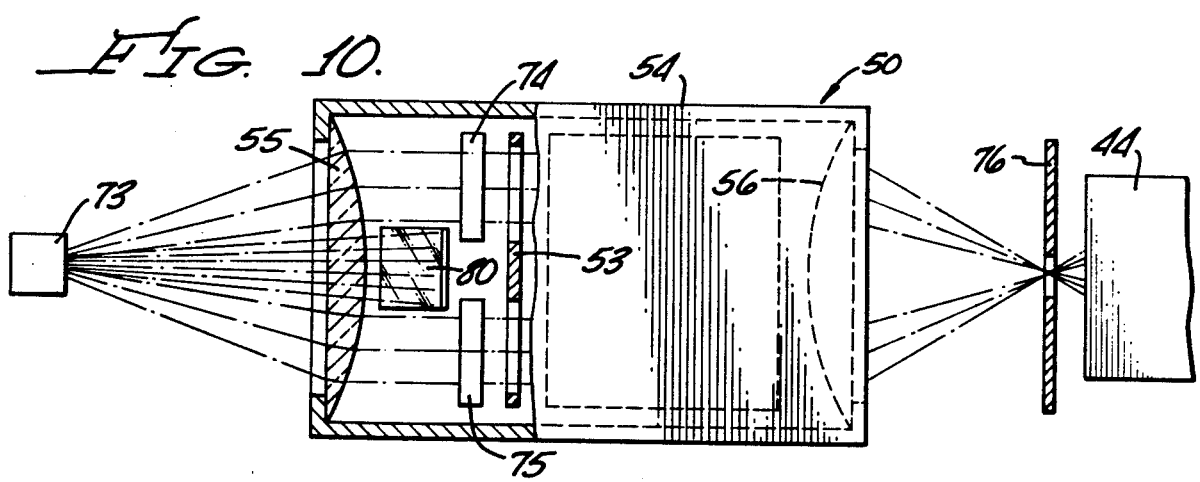

Still another configuration ideal for fluorescence measurements with a laser source is shown in FIG. 10. The configuration of FIG. 10 is similar to FIGS. 8 and 9, except that source 40, blocking filter 71, lens 72 and mirror 78 are omitted. Instead, a small plane mirror 80, within enclosure 54, between block filters 74 and 75, reflects light from a laser located normal to the plane of the illustration. The reflected rays are focused by lens 55 onto the fluorescing sample in cell 73. The scattered radiation is sensed by filter 50 in the same manner as described previously for the configuration of FIG. 9.

Figure 11:
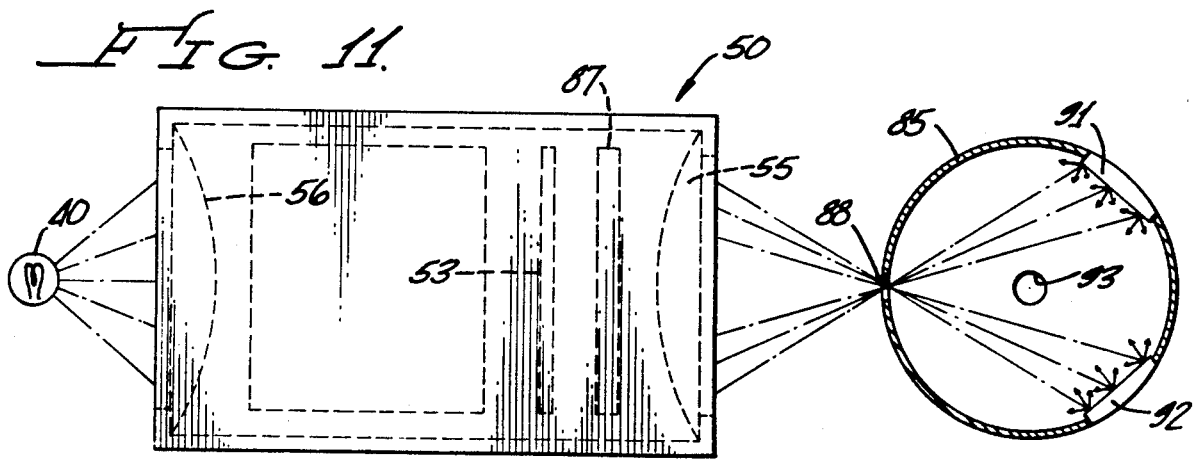

Referring now to FIG. 11, there is shown a configuration for making reflectance measurements. The configuration of FIG. 11 includes an integrating sphere 85 containing four ports. The configuration also includes source 40 and filter 50 having a single blocking filter 87 positioned therein, between aperture plate 53 and lens 55. The two halves of filter 50 alternately pass radiation of the same wavelength through one small port 88 in sphere 85, located at the focal point of lens 55. The rays alternately fall on a reference reflector plate 91 and a sample reflector 92 positioned at two of the remaining ports. The integrated reflected radiation is detected by a detector (not shown) located at a port 93 out of the plane of the illustration. The two beams are again isolated by alternately tuning the two halves of filter 50 to being opaque.

Alternately, the positions of source 40 and the detector in FIG. 11 can be interchanged. This permits a discrimination between reflection and fluorescence at the sample.

It was mentioned previously that in an eight-element filter, it is desirable to use two first-order elements. The reason for this is two-fold. The first-order element is the most effective in absorbing light in those vicinities furthest from the wavelength of maximum transmittance, where there is the most stray light. Therefore, by using two first-order elements, there tends to be a flattening of the area of minimum transmittance, that area between the two peaks in FIG. 2(a). Furthermore, one of the two first-order elements can be used as a modulator to render the filter alternately transmissive and opaque.

That is, recall that when $\Delta nd = M\lambda$, where M is an integer, the intensity equals unity and that when $\Delta nd = N\lambda/2$, where N is an odd integer, the intensity falls to zero. Thus, one of the first order elements in any of the filter arrangements of FIGS. 3-11 can alternately be driven between the conditions where the intensity equals unity and where the intensity is zero to render the filter transparent and opaque.

The major problems associated with the development of a wide tuning range birefringent filter, such as filter 50, have been discussed. It is desireable to provide a filter system tunable over the range 340–700 nm so as to cover both the ultraviolet and visible ranges. The ratio $\Delta n\lambda$ doubles between 700 and 432 nm. Between 432 and 336 nm, retardation doubles again. In theory, therefore, the 340–700 nm region could be covered with blocking filters isolating these two octaves. In practice, however, the finite HBW of a birefringent filter and the roll-off characteristics of absorption-type blocking filters force the use of three blocking filters. The use of three blocking filters alternately interposed in the optical beam should present no problem in practice. With a system designed to transmit at 700 nm with zero voltage applied to all of the filter cells, the filter system can be tuned from 700 nm to 340 nm by continuously increasing the voltage on the liquid crystal cells, with periodic changes in the blocking filters.

Considering the voltage necessary to drive a liquid crystal cell, the average tilt of the liquid crystal molecules in the cell increases as the field on the cell is increased. The average tilt is specified because there is a distribution of tilt within the cell. That is, those molecules closest to the cell walls hardly move and the central molecules experience the greatest tilt. The retardation produced in a properly oriented cell is a function of this average tilt.

The voltage function is defined as a plot of retardation versus voltage. The voltage function is determined by measuring transmittance at a fixed wavelength as a function of the applied field. The retardation is then computed from the transmittance using equation (3).

Since retardation as a function of voltage is a nonlinear function, one would expect that the voltage function for cells having different thicknesses would also be different. However, experimentation has shown that the voltage function expressed as a fraction of the zero field retardation is independent of the thickness of a cell. This is a highly desireable characteristic of liquid crystal cells since it means that the same voltage can be applied to all of the cells in a filter system, such as filter 50, provided the cells are of the proper thicknesses. This can ultimately permit the connection of all cells in parallel with a single set of leads for a filter system to adjust its transmittance over the range of 340–700 nm.

Careful attention has to be given to the waveform and frequency of the field applied to the cells of a filter when tuning wavelength. DC fields are undesirable because the cells can polarize, changing the retardation versus voltage function. Therefore, the voltage necessary to tune a filter should be applied to the cells as a symmetrical AC signal. On the other hand, dielectric anisotropy decreases with increasing frequency and, for some materials, may reverse sign around 30 kHz. Consequently, there is an optimum range of frequencies between DC and 30 kHz, and experiments have shown this range to be approximately 300 Hz to 3 kHz.

At least one of the cells of a filter may operate as a modulator to render the filter alternately transparent and opaque at the tuned wavelength. The modulator cell will usually be the thinnest cell in the filter since it will have the fastest response time to the modulating signal. Appreciable light intensity modulation can occur at frequencies as high as 1 kHz. Desireable modulation frequencies usually fall in the range of 10 to 100 Hz.

It is essential that the frequency used for tuning be significantly higher than the frequency used for modulation to avoid cell polarization effects. Hence, the tuning frequency should be at least 1 kHz. These factors lead to a filter in which a carrier signal having a frequency of 1–3 kHz is applied to all cells, while the signal applied to the modulator cell only is modulated at a frequency of 10 to 100 Hz between voltage levels which will render the filter alternately transmissive and opaque.

One of the disadvantages found for use of a birefringent filter, as described herein, is low transmittance. This low transmittance is largely caused by absorption within the polars and theoretically could be improved using superior polars. Glass blocking filters also contribute significant losses and better blocking filters of the interference type will increase transmittance. However, experimentation has shown that sufficient radiant power can be transmitted through a filter of the type described herein for the filter system to be practical.

It is possible to design a birefringent filter that passes a series of discrete wavelengths by using a fixed retarder, such as a quartz plate, only in the highest order element. Unlike the filter systems described heretofore, this filter does not incorporate a variable retarding component within the highest-order element. There are many spectral photometric applications where a series of discrete wavelengths suffice. For example, there are many clinical analyses that could be accomplished with a filter system selecting only the wavelengths 340, 380, 405, 465 and 700 nm. Such a filter could be constructed using the same eight-order combinations described hereinbefore, except for the highest-order element.

As can be seen from an examination of FIGS. 2(a)–2(c), the transmittance of each element is oscillatory as a function of wavelength with many maxima. These maxima are closest together for the highest order element. Therefore, the seven variable retardation cells can be used to tune the filter to one of the wavelengths at which the fixed retarder element has maximum transmission. The advantages of this system are: (1) a decreased sensitivity to temperature because of a low temperature coefficient of retardation in quartz and other solid state retarders, and (2) a narrow bandwidth with good response time. The latter advantage accrues because it is no longer necessary to vary the retardation of the highest order and slowest responding element.

The requirements on beam collimation with a birefringent filter warrant further discussion. If different portions of the beam experience varying retardation, the filter does not pass a narrow band of wavelengths and its performance degrades. Such a varying retardation can occur if the cell thickness is not uniform across the beam. It can also occur if the beam converges or diverges on passing through the cell. That is, if all the rays are not parallel (collimated), different rays will suffer different retardations, both because of propagation along paths of different distances and different indices. Retardation is most sensitive to collimation of rays in the plane common to the tilting optic axes of the liquid crystal molecules. Retardation is not very sensitive to collimation of rays in the perpendicular plane.

In the conventional Lyot filter, collimation sensitivity is minimized by rotating the optic axis by 90° in alternate retarding elements. In the present invention, collimation sensitivity is minimized by maintaining a common plane of the tilting optic axes in all cells. In this manner, collimation in this single plane only need be assured.

Collimation in one plane only is widely utilized in optical instruments by employing a slit as the defining aperture. The combination of a slit and a lens or mirror functioning as a collimator allows more light flux through a system then that obtained with a fully collimated beam obtained with a pin-hole aperture and a collimator.

It can, therefore, be seen that according to the present invention, a moderately narrow band, tunable, birefringent filter is disclosed using zero-twist, nematic-phase, liquid crystal cells 10 as variable retarders in Lyot-type arrangements. Filters 25 and 50 can achieve analytically useful levels of resolution and stray-light ratios for costs that are competitive with prism and grating monochromators. Moreover, filters 25 and 50 can be tuned and/or rendered opaque by applying appropriate voltages to the cells 10 thereof. Thus, a double-beam instrument, such as those shown in FIGS. 5–11, can be constructed with no moving parts other than those required to exchange blocking filters. Power requirements for such filters are negligible, and a useful filter can be designed to occupy a volume of less than one cubic inch. These properties render such a filter ideally suited to microprocessor control.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A tunable optical filter comprising:
    a plurality of polarizers spaced at intervals along a propagation axis, each polarizer being characterized by a plane of polarization;
    a plurality of birefringent elements spaced along the propagation axis within the intervals between the polarizers, any two birefringent elements being separated by at least one polarizer, each birefringent element having an optic axis oriented so that the plane defined by the optic axis and the propagation axis forms a 45° angle with the plane of polarization of each of the two polarizers immediately adjacent to and on opposite sides of that birefringent element, and at least one of the birefringent elements comprising a liquid crystal cell whose optic axis changes in response to a voltage applied to the cell;
    means for controllably tuning the filter to a selected wavelength by applying to each liquid crystal cell a voltage corresponding to the selected wavelength so that each birefringent element will produce a relative phase shift equal to a multiple of 180° between the ordinary and extraordinary orthogonally polarized components of a light ray having the selected wavelength propagating along the propagation axis;
    wherein each birefringent element is characterized as operating at a particular order, the order of an element being defined as the quotient obtained by dividing 360° into said relative phase shift equal to a multiple of 180°; and
    wherein said filter includes eight birefringent elements, having orders of 1, 1, 2, 3, 4, 5, 8 and 13, respectively.

2. A tunable optical filter comprising;
    a plurality of polarizers spaced at intervals along a propagation axis, each polarizer being characterized by a plane of polarization;
    a plurality of birefringent elements spaced along the propagation axis within the intervals between the polarizers, any two birefringent elements being separated by at least one polarizer, each birefringement element having an optic axis oriented so that the plane defined by the optic axis and the propagation axis forms a 45° angle with the plane of polarization of each of the two polarizers immediately adjacent to and on opposite sides of that birefringent element, and at least one of the birefringent elements comprising a liquid crystal cell whose optic axis changes in response to a voltage applied to the cell;
    means for controllably tuning the filter to a selected wavelength by applying to each liquid crystal cell a voltage corresponding to the selected wavelength so that each birefringent element will produce a relative phase shift equal to a multiple of 180° between the ordinary and extraordinary orthogonally polarized components of a light ray having the selected wavelength propagating along the propagation axis;
    wherein each birefringent element is characterized as operating at a particular order, the order of an element being defined as the quotient obtained by dividing 360° into said relative phase shift equal to a multiple of 180°; and
    wherein said filter includes an arithmetic progression of low order elements and a near geometric progression of high order elements.

3. A tunable optical filter according to claim 1 or 2, wherein all of said elements are identical except for the thicknesses thereof, which thicknesses vary in proportion to the orders thereof.

4. A two-wavelength optical instrument comprising:
    first and second tunable optical filters, each filter comprising:
        a plurality of polarizers spaced at intervals along a propagation axis, each polarizer being characterized by a plane of polarization;
        a plurality of birefringent elements spaced along the propagation axis within the intervals between the polarizers, any two birefringent elements being separated by at least one polarizer, each birefringent element having an optic axis oriented so that the plane defined by the optic axis and the propagation axis forms a 45° angle with the plane of polarization of each of the two polarizers immediately adjacent to and on opposite sides of that birefringent element, and at least one of the birefringent elements comprising a liquid crystal cell whose optic axis changes in response to a voltage applied to the cell; and means for controllably tuning the filter to a selected wavelength by applying to each liquid crystal cell a voltage corresponding to the selected wavelength so that each birefringent element will produce a relative phase shift equal to a multiple of 180° between the ordinary and extraordinary orthogonally polarized components of a light ray having the selected wavelength propagating along the propagation axis; and modulator means, comprising a liquid crystal cell, for alternately allowing light transmission along two paths including the first and second filters, respectively;

wherein the respective tuning means of the first and second filters may be tuned to two different selected wavelengths.

5. A tunable optical filter comprising;

a plurality of polarizers spaced at intervals along a propagation axis, each polarizer being characterized by a plane of polarization;

a plurality of birefringent elements spaced along the propagation axis within the intervals between the polarizers, any two birefringent elements being separated by at least one polarizer, each birefringent element having an optic axis oriented so that the plane defined by the optic axis and the propagation axis forms a 45° angle with the plane of polarization of each of the two polarizers immediately adjacent to and on opposite sides of that birefringent element, wherein the plurality of birefringent elements includes plural liquid crystal cells each of whose optic axis changes in response to a voltage applied to the cell;

means for applying the same voltage to each liquid crystal cell and for controllably tuning the filter to a selected wavelength by adjusting the voltage as a function of the selected wavelength so that each liquid crystal cell produces a relative phase shift equal to a multiple of 180° between the ordinary and extraordinary orthogonally polarized components of a light ray having the selected wavelength propagating along the propagation axis;

wherein each liquid crystal cell is characterized as operating at a particular order, the order of a cell being defined as the quotient obtained by dividing 360° into said relative phase shift produced by that cell equal to a multiple of 180°, the plural liquid crystal cells including cells of different orders; and wherein each liquid crystal cell has a thickness along the propagation axis such that the ratios between the thicknesses of the cells equal the ratios between the orders of the cells.

6. A tunable optical filter according to claim 5, wherein a said liquid crystal cell between two consecutive polarizers is defined by multiple birefringent liquid crystal cells between such consecutive polarizers and to which said same voltage is applied.

7. A tunable optical filter according to claim 5, wherein the voltage applied to one of said liquid crystal cells is alternated between values which render said filter alternately transmissive and opaque.

8. A filter according to claim 7, wherein said same voltage applied to each liquid crystal cell is a symmetrical AC voltage having a first frequency;

said alternation of the voltage applied to one cell between values rendering the filter transmissive and opaque is performed periodically at a second frequency; and the second frequency is much less than the first frequency.

9. A filter according to claim 8, wherein the first frequency is in the range of 300 Hz to 300 kHz, and the second frequency is in the range of 10 Hz to 100 Hz.

10. A filter according to claim 5, wherein the highest order birefringent element produces a greater relative phase shift than the other birefringent elements, and said highest order birefringent element is a fixed retarder whose retardation is independent of the tuning means.

* * * * *